（12）United States Patent
Beech et al.

(10) Patent No.: US 9,414,415 B1
(45) Date of Patent: Aug. 9, 2016

(54) CALL SETUP SYSTEM AND METHOD FOR SETTING UP A WIRELESS MEDIA SESSION EXTENDING FROM A FIRST NETWORK TO A SECOND NETWORK

(71) Applicant: Sprint Communications Company L.P., Overland Park, KS (US)

(72) Inventors: Hal S. Beech, Olathe, KS (US); Pierce Andrew Gorman, Lee's Summit, MO (US); Nicolas A. Nehme Antoun, Olathe, KS (US); Philip Martin Kunkel, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 203 days.

(21) Appl. No.: 14/022,707

(22) Filed: Sep. 10, 2013

(51) Int. Cl.
*H04W 76/02* (2009.01)

(52) U.S. Cl.
CPC .................................... *H04W 76/02* (2013.01)

(58) Field of Classification Search
None
See application file for complete search history.

(56) References Cited

U.S. PATENT DOCUMENTS

| 6,614,781 | B1* | 9/2003 | Elliott et al. ................... 370/352 |
| 6,876,646 | B1* | 4/2005 | Dore et al. ..................... 370/352 |
| 7,564,835 | B1* | 7/2009 | Grabelsky et al. ............. 370/352 |
| 2001/0036176 | A1* | 11/2001 | Girard ............................ 370/352 |
| 2003/0141093 | A1* | 7/2003 | Tirosh et al. ................. 174/72 A |
| 2003/0219103 | A1* | 11/2003 | Rao ...................... H04L 12/5601 |
| | | | 379/32.05 |
| 2005/0083844 | A1* | 4/2005 | Zhu et al. .................... 370/230.1 |
| 2008/0186952 | A1* | 8/2008 | Lin et al. ....................... 370/352 |
| 2008/0192759 | A1* | 8/2008 | Shiga et al. ................... 370/401 |
| 2011/0149956 | A1 | 6/2011 | Alt et al. |
| 2012/0157094 | A1* | 6/2012 | Cheng ............. H04M 1/274566 |
| | | | 455/433 |
| 2012/0163561 | A1* | 6/2012 | Zuo et al. ........................ 379/46 |

* cited by examiner

*Primary Examiner* — Ayaz Sheikh
*Assistant Examiner* — Peter Chau (57) ABSTRACT

A call setup system and method configured to setup a wireless media session extending from a first network to a second network are provided. The system in one example embodiment includes media gateways (MG-Bs) of a first network interface of an interconnect network and a soft switch B (SSW-B) within the first network. The SSW-B receives a media session initiation from a wireless communication device B (WCD-B) of the first network, wherein the WCD-B is attempting to initiate a media session to a wireless communication device A (WCD-A) of the second network, obtains a MG-Bx network address of a selected MG-Bx of the one or more MG-Bs, forwards a call initiation information to a SSW-A of the second network, and receives a media gateway MG-Ax network address from the SSW-A, wherein the WCD-B of first network is placed in communication with the WCD-A of the second network via the selected MG-Bx and the selected MG-Ax.

6 Claims, 6 Drawing Sheets

CALL SETUP SYSTEM AND METHOD FOR SETTING UP A WIRELESS MEDIA SESSION EXTENDING FROM A FIRST NETWORK TO A SECOND NETWORK

TECHNICAL FIELD

Aspects of the disclosure are related to the field of communications, and in particular, to a call setup system and method for setting up a wireless media session extending between networks.

TECHNICAL BACKGROUND

In communications environments, a communication initiation may require setting up a communication instance that extends between two or more networks. For example, in wireless telephone/cellular telephone communications, a wireless communication device in one network may attempt to contact a wireless communication device that is within a different network. The two networks may be different in terms of network ownership/billing, different in terms of communication protocol or protocols, different in terms of geographic locations, or different in additional or other ways.

For example, where the originating wireless communication device is in a first network operated by a first vendor and where the target wireless communication device is in a second network operated by a second vendor, then access between the two networks will be strictly regulated and controlled. Both vendor B and vendor A will enforce conditions that are designed to provide inter-communications access while providing security.

OVERVIEW

Systems and methods for setting up a wireless media session extending from a first network to a second network are provided herein. In one example, a call setup system configured to setup a wireless media session extending from the first network to the second network includes one or more media gateways (MGs) of a first network interface of an interconnect network between the first network and the second network and a soft switch B (SSW-B) within the first network, with the SSW-B configured to communicate with the one or more MGs and communicate with a soft switch A (SSW-A) of the second network, with the SSW-B further configured to receive a media session initiation from a wireless communication device B (WCD-B) of the first network, wherein the WCD-B is attempting to initiate a media session to a wireless communication device A (WCD-A) of the second network, obtain a media gateway B (MG-Bx) network address of a selected MG-Bx of the one or more MG-Bs of a first network interface of the interconnect network, wherein the selected MG-Bx comprises a first network endpoint of the interconnect network, forward a call initiation information to the SSW-A of the second network, and receive a media gateway MG-Ax network address from the SSW-A of the second network, wherein the selected MG-Ax comprises a second network endpoint of the interconnect network and wherein the WCD-B of the first network is placed in communication with the WCD-A of the second network via the selected MG-Bx and the selected MG-Ax of the interconnect network.

In an example of a call setup method configured to setup a wireless media session extending from a first network to a second network, the method includes in a soft switch B (SSW-B) of the first network, receiving a media session initiation from a wireless communication device B (WCD-B) of the first network, wherein the WCD-B is attempting to initiate a media session to a wireless communication device A (WCD-A) of the second network, in the SSW-B, obtaining a media gateway B (MG-Bx) network address of a selected MG-Bx of one or more MG-Bs of a first network interface of an interconnect network between the first network and the second network, wherein the selected MG-Bx comprises a first network endpoint of the interconnect network, in the SSW-B, forwarding a call initiation information to a soft switch A (SSW-A) of the second network, and in the SSW-B, receiving a media gateway MG-Ax network address from the SSW-A of the second network, wherein the selected MG-Ax comprises a second network endpoint of the interconnect network and wherein the WCD-B of the first network is placed in communication with the WCD-A of the second network via the selected MG-Bx and the selected MG-Ax of the interconnect network.

In another example of a call setup method configured to setup a wireless media session extending from a first network to a second network, the method includes in a soft switch B (SSW-B) of the first network, receiving a media session initiation from a wireless communication device B (WCD-B) of the first network, wherein the WCD-B is attempting to initiate a media session to a wireless communication device A (WCD-A) of the second network, in the SSW-B, processing the WCD-B telephone number and the WCD-A telephone number and determining the media session is being routed from the first network to the second network via an interconnect network between the first network and the second network, in the SSW-B, obtaining a media gateway B (MG-Bx) network address of a selected MG-Bx of one or more MG-Bs of a first network interface of the interconnect network, wherein the selected MG-Bx comprises a first network endpoint of the interconnect network, in the SSW-B, binding WCD-B to a radio access network B (RAN-Bx) of the first network during the media session initiation and wherein a communication path is established between the RAN-Bx and the selected MG-Bx, in the SSW-B, forwarding the MG-Bx network address and a call initiation information to a soft switch A (SSW-A) of the second network, with the SSW-A processing the WCD-B telephone number and the WCD-A telephone number and determining the media session is being routed from the first network to the second network via the interconnect network, in the SSW-B, receiving a media gateway MG-Ax network address of a selected MG-Ax from the SSW-A of the second network, wherein the selected MG-Ax comprises a second network endpoint of the interconnect network and wherein the WCD-B of the first network is placed in communication with the WCD-A of the second network via the selected MG-Bx and the selected MG-Ax of the interconnect network, with the SSW-A binding the selected MG-Ax to a selected radio access network A (RAN-Ax) of the second network and with the SSW-A binding the RAN-Ax to the WCD-A, and in the SSW-B, reporting a call setup completion to the WCD-B after receiving the MG-Ax network address from the SSW-A, wherein the first network endpoint and the second network endpoint perform IP-to-IP communications.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the sev

DETAILED DESCRIPTION

Figure 1:
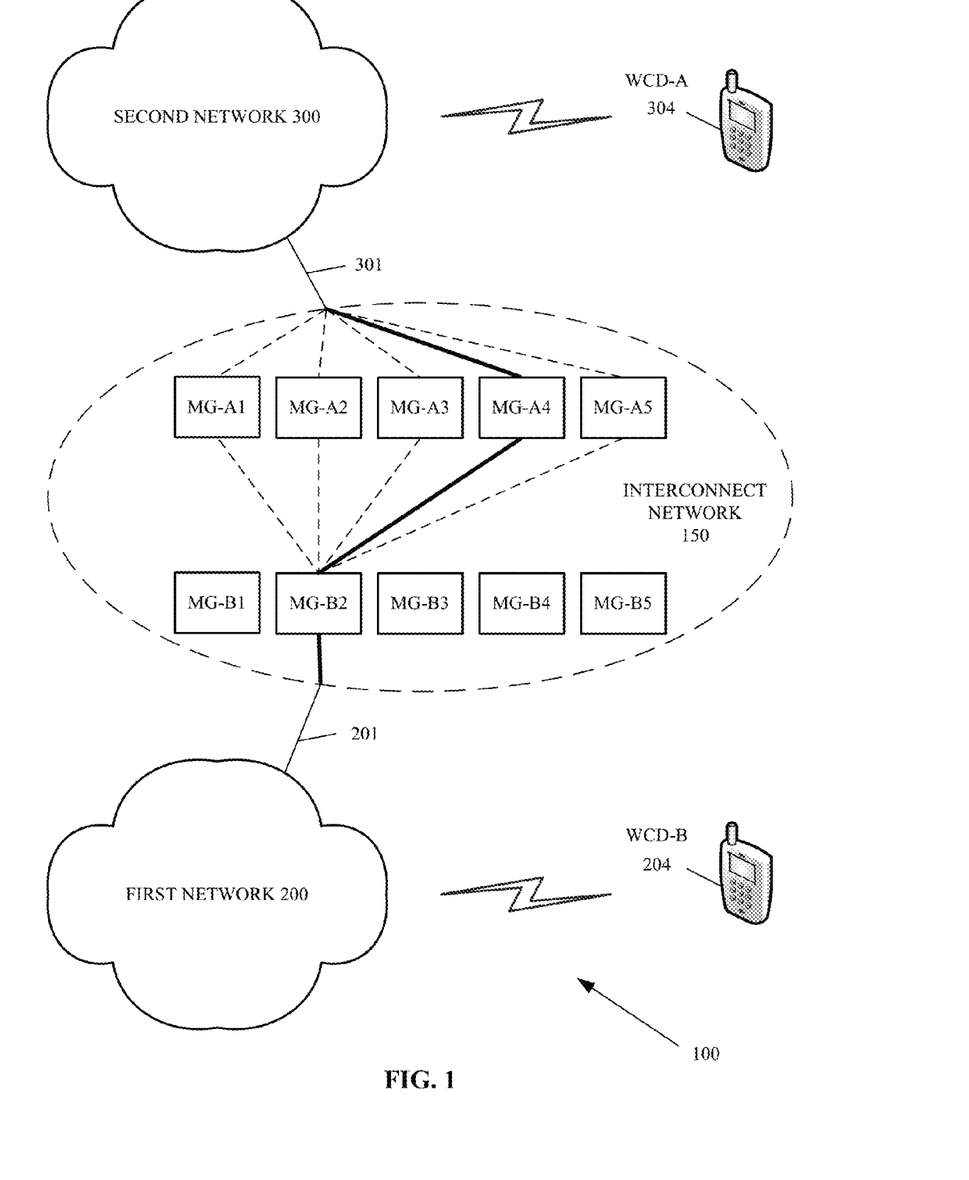
- FIG. 1 shows a communication environment including a second network, a first network, and an interconnect network.

FIG. 1 shows a communication environment 100 including a second network 300, a first network 200, and an interconnect network 150. The second network 300 (i.e., network A) is coupled to one side of the interconnect network 150, while the first network 200 (i.e., network B) is coupled to another side of the interconnect network 150, wherein the second network 300 and the first network 200 can be selectively coupled together to exchange communications. A wireless communication device B (WCD-B) 204 is currently within the first network 200 and a wireless communication device A (WCD-A) 304 is currently within the second network 300. The WCD-B 204 of the first network 200 is attempting to establish a media session to the WCD-A 304 of the second network 300. However, because the media session will span the two networks, the media session setup is more complicated than a media session between two WCDs that are communicating within a single network.

The second network 300 and the first network 200 comprise different networks, wherein the two networks may be different in that they may have one or more of different owners, different protocols, and/or different geographic locations, for example. As a result, communication between the first network 200 and the second network 300 can be achieved only through a proper communication procedure. Communications exchanged between the first network 200 and the second network 300 in the example shown are routed through an interconnect network 150. Although the discussion herein centers on setting up a wireless media session between two networks, it should be understood that the call setup system and method can be employed to set up calls between a plurality of networks.

The interconnect network 150 includes components that enable inter-network communication. The interconnect network 150 is configured to provide secure communications between networks. The interconnect network 150 is configured to provide communications wherein addresses used for intercommunications are not pre-established and fixed, as pre-established and fixed addresses may create security vulnerabilities.

In the example shown, the first network 200 is setting up the media session and therefore makes the first connection. The interconnect network 150 has selected MG-B2 230 for the first network interface of the interconnection. At this point, the interconnect network 150 can select any one of the MG-A1, the MG-A2, the MG-A3, the MG-A4, or the MG-A5 for the second network interface of the interconnection. In the example shown, the interconnect network 150 selects MG-A4 330. Two endpoints now have been chosen in the interconnect network 150. The addresses of the two endpoints are communicated to the first network 200 and to the second network 300. Communications can now be exchanged between the first network 200 and the second network 300 via the MG-B2 and the MG-A4 in this example.

It can be seen from the figure that a number of endpoint combinations are possible in the interconnect network 150. Where each network includes multiple MGs, a large number of MG-B to MG-A connection combinations are possible. The connection can be created as needed, and can be dropped when no longer needed. It can be seen that the routing of communications between the first network 200 and the second network 300 is therefore flexible and can vary over time. The ability to route communications through the interconnect network 150 in various ways enables more choice in how communications are linked between the first network 200 and the second network 300. The ability to route communications in various ways gives the interconnect network 150 the ability to control communication flow. The ability to route communications enables the interconnect network 150 to route around bad links, heavy traffic, links with high bit error rates, or other difficulties.

The first network 200 (and also the second network 300) can comprise a VOIP network, a PSTN network, a cellular telephone network, or any digital (i.e., IP-capable) network that can also handle media sessions.

Figure 2:
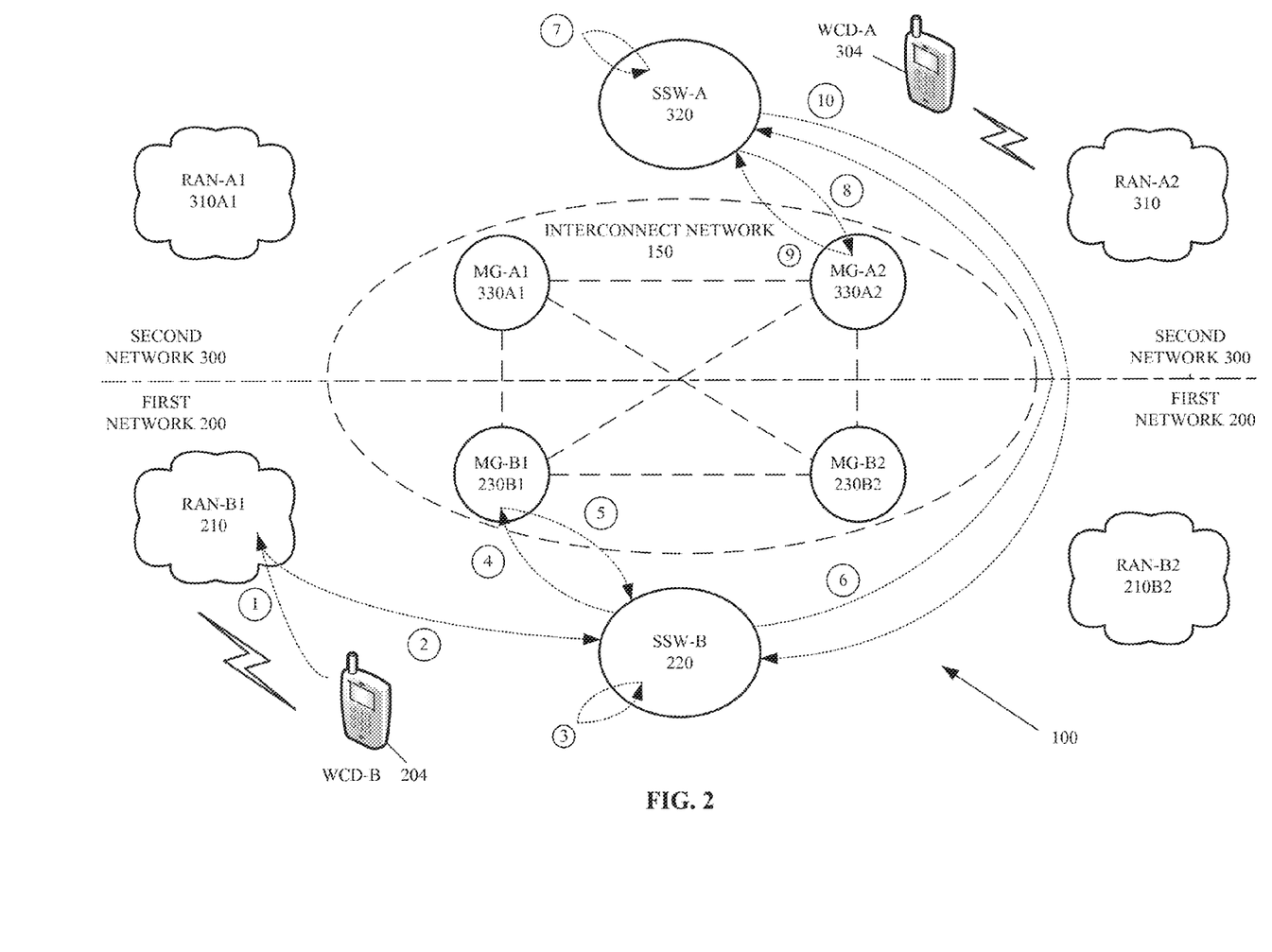
FIG. 2 shows detail of the communication environment.

FIG. 2 shows detail of the communication environment 100. The first network 200 can include various network components and structures that enable communications to be relayed to various endpoints within the first network 200. In the example shown, the first network 200 includes two Radio Access Networks (RANs) RAN-B1 210 and RAN-B2 210B2, a soft switch (SSW) B 220, and one or more MG-Bs labeled MG-B1 230B1 and MG-B2 230B2. The MGs 230B1 and 230B2 also comprise components of the interconnect network 150.

The second network 300 can include various network components and structures that enable communications to be relayed to various endpoints within the second network 300. In the example shown, the second network 300 includes RAN-A2 310 and RAN-A1 310A1, a SSW-A 320, and one or more MGs labeled MG-A1 330A1 and MG-A2 330A2. The MGs 330A1 and 330A2 also comprise components of the interconnect network 150.

When communications are to be exchanged between the first network 200 and the second network 300, then a MG-B must be chosen as the first network endpoint of the interconnect network 150 and a MG-A must be chosen as the second network endpoint. However, the RANs of the two networks do not need to know any details of the interconnect network 150 or the MGs of the interconnect network 150. The RANs 210 and 310 of the two networks do not need to participate in the call setup through the interconnect network 150. This has advantages in security, as the MGs participating in a particular call will obtain interconnect address information as needed, and dedicated MG addresses do not have to be employed.

In the example shown, at arrow 1 the WCD-B 204 communicates with the RAN-B1 in order to initiate a media session to the WCD-A 304. The WCD-B 204 is currently located within the first network 200 and communicates with the first network 200 via the RAN-B1 210 (i.e., the WCD-B 204 is within the service area of the RAN-B1 210). The RAN-B1 210 receives the media session initiation from the WCD-B 204.

The media session initiation comprises a media session initiation from an electronic device capable of making a media session. The electronic device can comprise a telephone or cellular phone, for example, but can comprise other devices, such as a smartphone, tablet computer, laptop or desktop computer, or other computerized device with media session capability.

The media session initiation can include various items of information. The media session initiation can include an originating telephone number of the electronic device initiating the media session (i.e., the telephone number of the WCD-B 204). The media session initiation can include a dialed telephone number (i.e., the telephone number of the WCD-A 304).

At arrow 2, the RAN-B1 210 relays the media session initiation to the SSW-B 220.

At arrow 3, the SSW-B 220 processes the dialed telephone number and determines that the WCD-A 304 is not within the first network 200. Further, the SSW-B 220 determines that the dialed telephone number is within the second network 300.

At arrow 4, the SSW-B 220 communicates with the interconnect network 150 and requests a MG-B, where MG-B can comprise any suitable MG of the first network interface of the interconnect network 150. The SSW-B 220 does not participate in selecting the MG-B in some examples, and merely requests a MG-B to use in the media session.

At arrow 5, the interconnect network 150 selects a MG-Bx 230B1 or 230B2 from the first network interface and reports the corresponding interconnect network address to the SSW-B 220. The selected MG-Bx 230B1 or 230B2 (i.e., MG-B1 230B1 in the example shown) obtains a first interconnect network address for the media session. The interconnect network address makes the MG-B1 230B1 the first network endpoint for the media session. The SSW-B 220 adds the MG-B1 230B1 interconnect network address to the media session initiation. The media session initiation now includes at least the dialed telephone number (i.e., the telephone number of WCD-A 304), the telephone number of the WCD-B 204, and the interconnect network address of MG-B1 230B1.

At arrow 6, the SSW-B 220 forwards the media session initiation to the SSW-A 320 of the second network 300.

At arrow 7, the SSW-A 320 receives the media session initiation and processes the telephone number of the WCD-A 304, determining that the telephone number of the WCD-B 204 is not within the second network 300 and instead is within the first network 200.

At arrow 8, the SSW-A 320 communicates with the interconnect network 150 and requests a MG-A, where MG-A can comprise any suitable MG of the second network interface of the interconnect network 150. The SSW-A 320 does not participate in selecting the MG-A in some examples, and merely requests a MG-A to use in the media session.

At arrow 9, the interconnect network 150 selects a MG-Ax 330A1 or 330A2 from the second network interface and reports the interconnect network address to the SSW-A 320. The selected MG-Ax 330A1 or 330A2 obtains a second interconnect network address for the media session. The interconnect network address makes the MG-Ax 330A1 or 330A2 the second network endpoint for the media session. The SSW-A 320 adds the MG-Ax 330A1 or 330A2 interconnect network address to the media session initiation. The media session initiation now includes at least the dialed telephone number, the telephone number of the WCD-B 204, the interconnect network address of MG-B1 230B1, and the interconnect network address of MG-Ax 330A1 or 330A2.

At arrow 10, the SSW-A 320 reports the selected MB-Ax 330A1 or 330A2 address to the SSW-B 220 of the first network 200. Consequently, a communication interconnect is now configured between the first network 200 and the second network 300. In the example shown, the communication interconnect extends between the MG-B1 230B1 and the MG-A2 330A2. At this point, the interconnect network 150 is set up for the media session.

The call setup is substantially complete. The call is subsequently communicated between the first network 200 and the second network 300 by the interconnect network 150.

Figure 3:
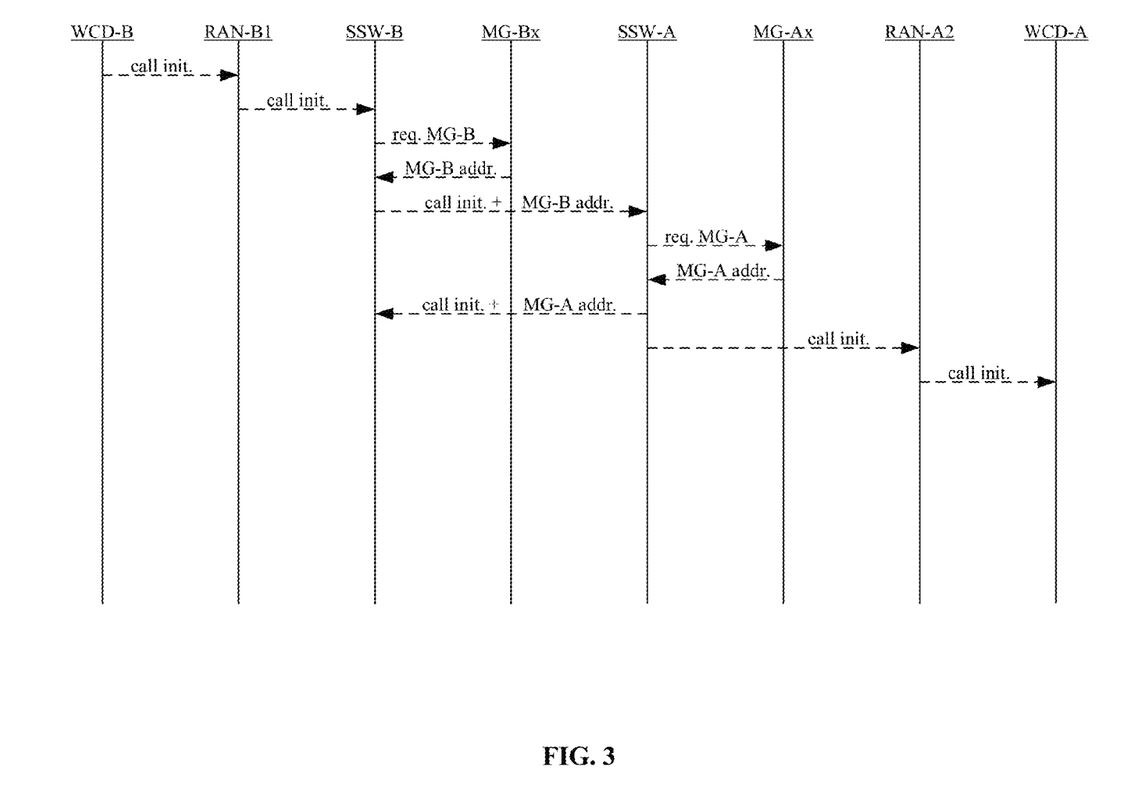
FIG. 3 is a signal flow diagram for the call setup method.

FIG. 3 is a signal flow diagram for the call setup method. At the first arrow, the WCD-B 204 sends a call initiation to the RAN-B1 in order to initiate a media session to the WCD-A 304. The initiating device WCD-B 204 is in the first network 200 and the target device WCD-A 304 is in the second network 300.

The RAN-B1 210 forwards the call initiation to the SSW-B 220. The call initiation includes the telephone number of the WCD-A 304 (i.e., the dialed telephone number) and includes the telephone number of the WCD-B 204 (i.e., the originating telephone number).

The SSW-B 220 receives the call initiation and processes the originating telephone number and the dialed telephone number to determine that the dialed telephone number is not within the first network 200. The SSW-B 220 further determines that the dialed telephone number is within the second network 300. The SSW-B 220 requests a MG address from the interconnect network 150. The SSW-B 220 requests a MG address from the interconnect network 150 as a result of determining that the dialed telephone number is within the second network 300 and that the interconnect network 150 between the first network 200 and the second network 300 will need to be used to set up the media session.

The interconnect network 150 processes the request for a MG-B. The interconnect network 150 selects a MG-Bx, obtains a network address for the selected MG-Bx, and reports the MG-Bx network address to the SSW-B 220.

The SSW-B 220 forwards the call initiation to a SSW-A 320 of the second network 300. The call initiation now includes the selected MG-Bx address.

The SSW-A 320 receives the call initiation and processes the originating telephone number and the dialed telephone number to determine that the originating telephone number is not within the second network 300. The SSW-A 320 further determines that the originating telephone number is within the first network 200. The SSW-A 320 requests a MG address from the interconnect network 150. The SSW-A 320 requests a MG address from the interconnect network 150 as a result of determining that the telephone number of the initiating device WCD-B 204 is within the first network 200 and that the interconnect network 150 between the first network 200 and the second network 300 will need to be used to set up the media session.

The interconnect network 150 processes the request for a MG-A. The interconnect network 150 selects a MG-Ax, obtains a network address for the selected MG-Ax, and reports the MG-Ax network address to the SSW-A 320.

The SSW-A 320 forwards the call initiation to the SSW-B 220. The call initiation now includes the selected MG-Ax address.

The SSW-A 320 forwards the call initiation to the RAN-A2 310. The WCD-A 304 is located in the service area of the RAN-A2 310.

The RAN-A2 310 forwards the call initiation to the WCD-A 304, wherein the RAN-A2 310 completes the call setup to the WCD-A 304.

Figure 4:
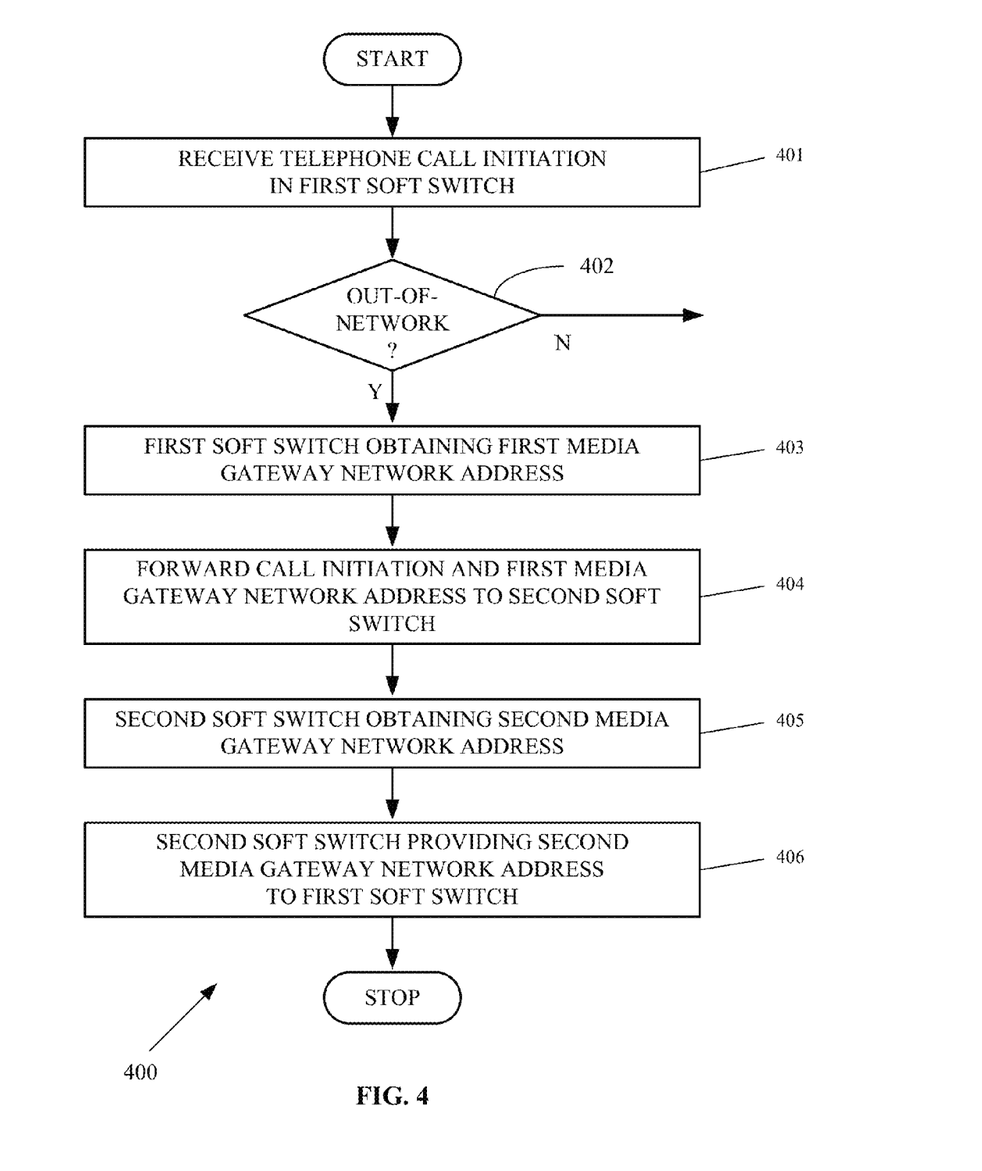
FIG. 4 is a flowchart of an exemplary call setup method.

FIG. 4 is a flowchart 400 of an exemplary call setup method. In step 401, a media session initiation is received. The media session initiation is received in a SSW-B of the first network. The media session initiation may first be received in a RAN-B1 of the first network, wherein the RAN-B1 is contacted by a WCD-B, and the RAN-B1 relays the media session initiation to the SSW-B.

The media session initiation comprises a media session initiation from an electronic device capable of making a media session. The electronic device can comprise a telephone or cellular phone, for example, but can comprise other devices, such as a smartphone, tablet computer, laptop or desktop computer, or other computerized device with media session capability.

The media session initiation can include various items of information. The media session initiation can include an originating telephone number of the electronic device initiating the media session (i.e., the telephone number of the WCD-B). The media session initiation can include a dialed telephone number (i.e., the telephone number of the WCD-A).

In step 402, the SSW-B processes the call initiation information included with the media session initiation. In some examples, the SSW-B processes the dialed telephone number to determine if it is out-of-network, i.e., whether the dialed telephone number is inside or outside the current network of SSW-B. If the dialed telephone number is within the current network, then the method exits. Otherwise, where the dialed telephone number is outside the current network, then the method proceeds to step 403.

In step 403, the SSW-B obtains a MG network address from an interconnect network between the first network and the second network. The MG network address comprises an address of a particular MG-Bx of the first network interface of the interconnect network. The SSW-B does not choose the particular MG-Bx, and the particular MB-Bx is selected instead by the interconnect network. The MG-Bx network address is reported to the SSW-B. The SSW-B in some examples adds the MG-Bx network address to the call initiation information. The MG-Bx comprises a first network endpoint of the interconnect network between the first network 200 and the second network 300.

In step 404, the SSW-B forwards the media session initiation to a second soft switch A (SSW-A) of the second network 300. The forwarded media session initiation includes the MG-Bx network address.

In step 405, the SSW-A processes the call initiation information included with the media session initiation. The SSW-A processes the originating telephone number and determines that the originating telephone number is out-of-network, i.e., the originating telephone number is outside the current network of SSW-A. The SSW-A then obtains a second MG network address from the interconnect network. The MG-Ax network address comprises an address of a particular MG-Ax of the second network interface of the interconnect network. The particular MB-Ax is selected by the interconnect network. The MG-Ax network address is reported to the SSW-A. The SSW-A in some examples adds the MG-Ax network address to the call initiation information. The MG-Ax comprises a second network endpoint of the interconnect network between the first network 200 and the second network 300.

In step 406, the SSW-A provides the MG-Ax network address to the SSW-B. Consequently, a communication interconnect is now configured between the first network 200 and the second network 300. At this point, the interconnect network is set up for the media session.

Figure 5:
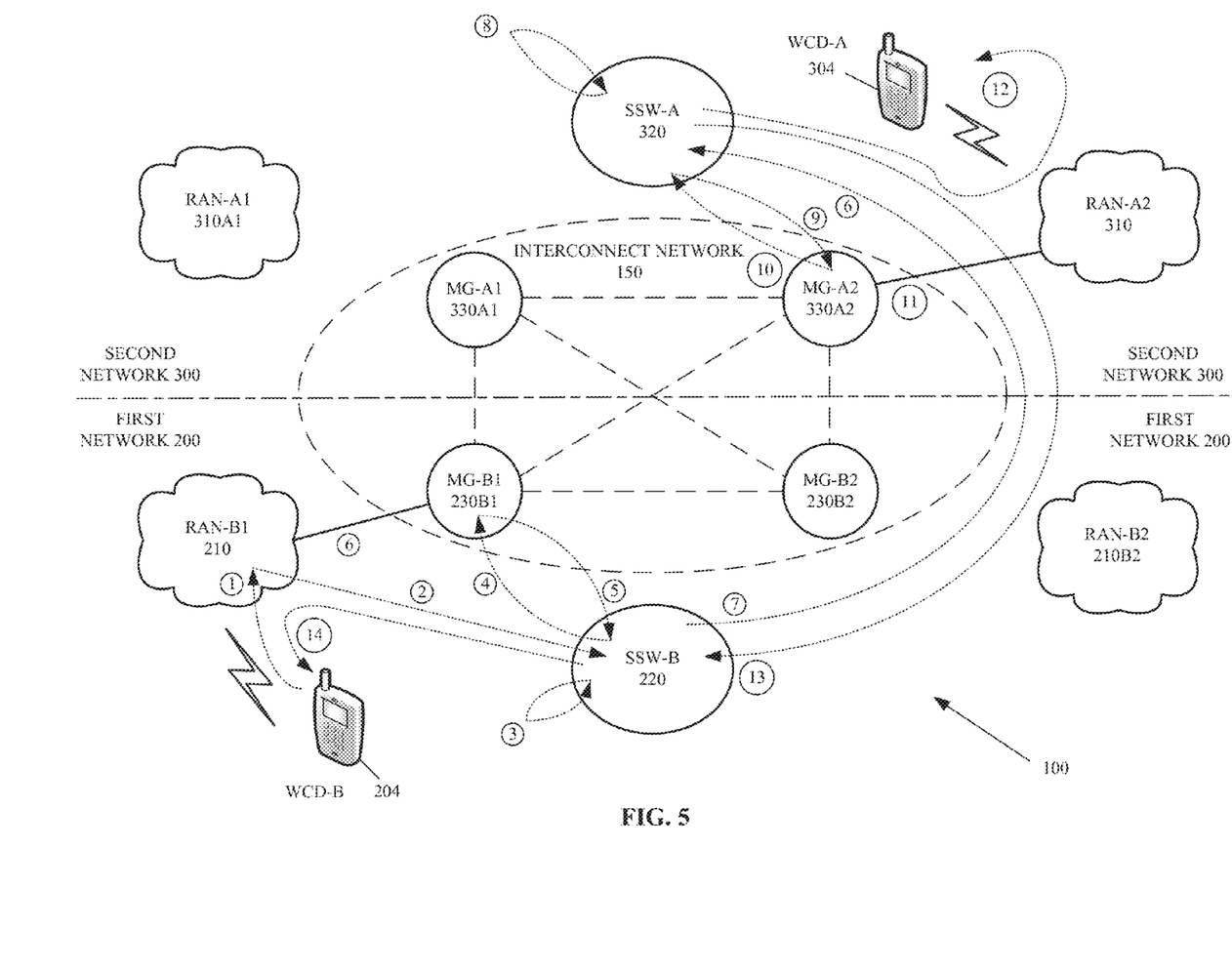
FIG. 5 shows further detail of an exemplary call setup method.

FIG. 5 shows further detail of an exemplary call setup method. In the example shown, at arrow 1 the WCD-B 204 initiates a media session to the WCD-A 304, as previously discussed.

At arrow 2, the RAN-B1 210 relays the media session initiation to the SSW-B 220, as previously discussed.

At arrow 3, the SSW-B 220 processes the telephone number of the WCD-A 304 and determines that communication must be established through the interconnect network 150, as previously discussed.

At arrow 4, the SSW-B 220 communicates with the interconnect network 150 and requests a MG-B, where MG-B can comprise any suitable MG of the first network interface of the interconnect network 150. The SSW-B 220 does not participate in selecting the MG-B in some examples, and merely requests a MG-B to use in the media session.

At arrow 5, the interconnect network 150 selects a MG-Bx 230B1 or 230B2 from the first network interface and reports the corresponding interconnect network address to the SSW-B 220. The selected MG-Bx 230B1 or 230B2 (i.e., MG-B1 230B1 in the example shown) obtains a first interconnect network address for the media session. The interconnect network address makes the MG-B1 230B1 the first network endpoint for the media session. The SSW-B 220 adds the MG-B1 230B1 interconnect network address to the media session initiation. The media session initiation now includes at least the dialed telephone number, the originating telephone number, and the interconnect network address of MG-B1 230B1.

At line 6, the SSW-B 220 binds the RAN-B1 210 to the selected MG-Bx 230B1. Media session audio and signaling can now be exchanged between the MG-B1 230B1 and the RAN-B1 210.

At arrow 7, the SSW-B 220 forwards the media session initiation to the SSW-A 320 of the second network 300.

At arrow 8, the SSW-A 320 receives the media session initiation and processes the telephone number of the WCD-B 204, determining that the telephone number of the WCD-B 204 is not within the second network 300 and instead is within the first network 200.

At arrow 9, the SSW-A 320 communicates with the interconnect network 150 and requests a MG-A, where MG-A can comprise any suitable MG of the second network interface of the interconnect network 150. The SSW-A 320 does not participate in selecting the MG-A in some examples, and merely requests a MG-A to use in the media session.

At arrow 10, the interconnect network 150 selects a MG-Ax 330A1 or 330A2 from the second network interface and reports the corresponding interconnect network address to the SSW-A 320. The selected MG-Ax 330A1 or 330A2 (i.e., MG-A2 330A2 in the example shown) obtains a second interconnect network address for the media session. The interconnect network address makes the MG-A2 330A2 the second network endpoint for the media session. The SSW-A 320 adds the MG-A2 330A2 interconnect network address to the media session initiation. The media session initiation now includes at least the dialed telephone number, the originating telephone number, the interconnect network address of MG-B1 230B1, and the interconnect network address of MG-A2 330A2.

At line 11, the SSW-A 320 binds the RAN-A2 310 to the selected MG-A2 330A2. Media session audio and signaling can now be exchanged between the MG-A2 330A2 and the RAN-A2 310.

At arrow 12, the SSW-A 320 binds the RAN-A2 310 to the WCD-A 304. Media session audio and signaling can now be exchanged between the RAN-A2 310 and the WCD-A 304.

At arrow 13, the SSW-A 320 reports the selected MB-A2 330A2 address to the SSW-B 220 of the first network 200. Consequently, a communication interconnect is now configured between the first network 200 and the second network 300. In the example shown, the communication interconnect extends between the MG-B1 230B1 and the MG-A2 330A2.

At arrow 14, the SSW-B 220 signals the WCD-B 204 that the media session is now set up. The media session can commence.

The call setup is substantially complete. The call is subsequently communicated between the first network 200 and the second network 300 by the interconnect network 150.

Figure 6:
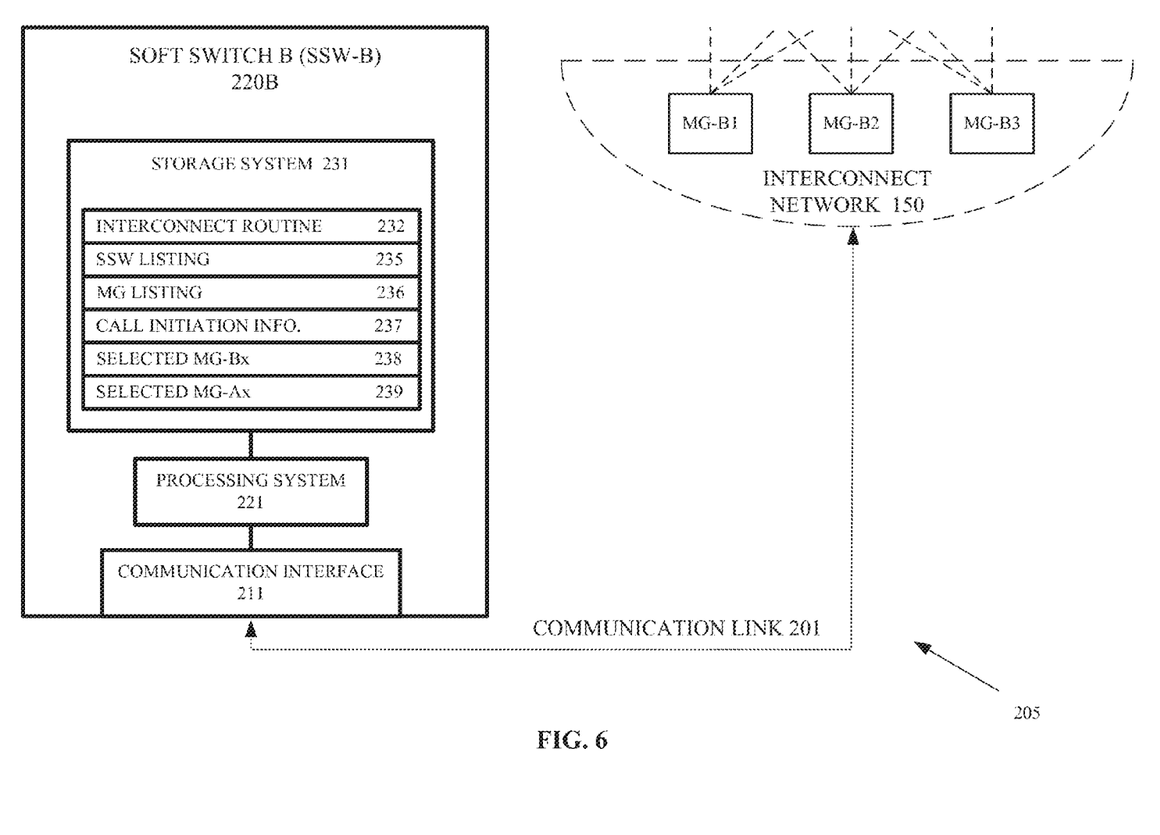
FIG. 6 shows an exemplary call setup system of first network.

FIG. 6 shows an exemplary call setup system 205 of the first network 200. It should be understood that multiple such call setup systems may exist, and enable the extension of a media session (or other communication) between different networks. The call setup system 205 includes a SSW-B 220B, an interconnect network 150, and a communication link 201 coupling the SSW-B 220B to the interconnect network 150. The second network 300 must include a similar call setup system before the first network 200 and the second network 300 can exchange communications through the interconnect network 150.

The interconnect network 150 includes first network components (shown) and second network components (not shown). The first network components can communicate with the second network components in order to exchange communications between the first network 200 and the second network 300. It should be understood that the interconnect network 150 may include components for more than two networks. In the example shown, the interconnect network 150 includes three MGs in the first network interface, the MGs MG-B1 through MG-B3. However, it should be understood that the interconnect network 150 may include any number of MGs.

The SSW-B 220B in the example shown includes a communication interface 211, a processing system 221, and a storage system 231.

The communication interface 211 is coupled to the communication link 201. The communication interface 211 may exchange communications over the communication link 201. The communication link 201 may be coupled to the interconnect network 150, as shown. In addition, the communication link 201 may be coupled to any MGs and RANs of the first network 200. The communication link 201 may further be coupled to devices of the second network 300.

The storage system 231 stores data including operational data. The storage system 231 in an example stores an interconnect routine 232, a soft switch (SSW) listing 235, a media gateway (MG) listing 236, a media session initiation information 237, a selected MG-Bx information 239, and a selected MG-Ax information 239. Other data may also be stored in the storage system 231.

The interconnect routine 232 comprises a routine that, when executed by the processing system 221, configures the SSW-B 220B (and the call setup system 205) to set up a wireless media session extending from the first network 200 to the second network 300. The interconnect routine 232 comprises a routine that, when executed by the processing system 221, configures the SSW-B 220B (and the call setup system 205) to receive a media session initiation from a wireless communication device B (WCD-B) of the first network 200, wherein the WCD-B is attempting to initiate a media session to a wireless communication device A (WCD-A) of the second network 300, obtain a media gateway B (MG-Bx) network address of a selected MG-Bx of the one or more MG-Bs, wherein the selected MG-Bx comprises a first network endpoint of the interconnect network 150 between the first network 200 and the second network 300, forward a call initiation information to the SSW-A of the second network 300, and receive a media gateway MG-Ax network address from the SSW-A of the second network 300, wherein the MG-Ax comprises a second network endpoint of the interconnect network 150 and wherein the WCD-B of the first network 200 is placed in communication with the WCD-A of the second network 300 via the MG-Bx and the MG-Ax of the interconnect network 150.

The SSW listing 235 comprises information about soft switches of other networks that can be accessed through the interconnect network 150. One or more other networks can be accessed through the interconnect network 150. The SSW listing 235 can list all soft switches of other networks or can list only the soft switches that can set up communications through the interconnect network 150.

The MG listing 236 comprises information about MGs of the present network (i.e., the first network in the present example). The MG listing 236 can comprise a listing of all MGs of the present network that comprise a part of the interconnect network 150.

The call initiation information 237 comprises information received in the SSW-B 220B as part of the media session initiation. The call initiation information 237 can include a telephone number of the WCD-B 204, for example (i.e., the originating telephone number). The call initiation information 237 can include a telephone number of the WCD-A 304, for example (i.e., the dialed telephone number). The call initiation information 237 can further include information for the selected MG network addresses for the interconnect network 150, such as the selected MG-Bx information 238 and the selected MG-Ax information 239, discussed below.

The selected MG-Bx information 238 comprises a MG-Bx interconnect network address. The selected MG-Bx information 238 specifies a first network interface endpoint in the interconnect network 150. The selected MG-Bx information 238 is received from the interconnect network 150 and is used to exchange communications between the first network 200 and the second network 300.

The selected MG-Ax information 239 comprises a MG-Ax interconnect network address. The selected MG-Ax information 239 specifies a second network interface endpoint in the interconnect network 150. The selected MG-Ax information 239 is received from the interconnect network 150 and is used to exchange communications between the first network 200 and the second network 300.

The communication interface 211 may communicate in a wired or wireless fashion over the communication link 100. The communication link 100 may comprise any suitable wired or wireless link. The communication interface 211 can use various protocols or communication formats.

The processing system 221 comprises one or more microprocessors and other circuitry that retrieves and executes the interconnect routine 232 from the storage system 231. The processing system 221 can be implemented within a single processing device or can be distributed across multiple processing devices or sub-systems that cooperate in executing program instructions. Examples of the processing system 221 include general purpose central processing units, application specific processors, and logic devices, as well as any other type of processing device, combinations, or variations thereof.

The storage system 231 comprises a computer readable storage media readable by the processing system 221 and capable of storing the interconnect routine 232. The storage system 231 can include volatile and nonvolatile, removable and non-removable media implemented in any method or technology for storage of information, such as computer readable instructions, data structures, program modules, or other data. The storage system 231 may be independent from or integrated into the processing system 221. Data is stored in and recalled from the storage system 231.

In addition to storage media, in some examples, the storage system 231 can include communication media over which the interconnect routine 232 can be communicated. The storage system 231 can be implemented as a single storage device but can also be implemented across multiple storage devices or sub-systems co-located or distributed relative to each other. The storage system 231 can comprise additional elements, such as a controller, capable of communicating with the processing system 221. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

The interconnect routine 232 can include additional processes, programs, or components, such as operating system software, database software, or application software. The interconnect routine 232 can also comprise firmware or some other form of machine-readable processing instructions executable by the processing system 221.

Encoding the interconnect routine 232 on the storage system 231 can transform the physical structure of the storage system 231. The specific transformation of the physical structure can depend on various factors in different implementations of this description. Examples of such factors can include, but are not limited to the technology used to implement the storage media of the storage system 231 and whether the computer-storage media are characterized as primary or secondary storage. For example, if the computer-storage media are implemented as semiconductor-based memory, the interconnect routine 232 can transform the physical state of the semiconductor memory when the program is encoded therein. For example, the interconnect routine 232 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The WCDs 204 and 304 can comprise any mobile communication devices and protocols, including cellular phones. The WCDs 204 and 304 can perform communication services including voice calls, text messages, data access, or other communication services provided over packet communication networks, such as cellular or wireless packet communication networks. The WCDs 204 and 304 can comprise subscriber equipment, customer equipment, an access terminal, a smartphone, a telephone, a mobile wireless telephone, a personal digital assistant (PDA), a computer, an e-book, a mobile Internet appliance, a wireless network interface card, a media player, a game console, or some other wireless communication apparatus, including combinations thereof.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a data communication system to exchange user data between a first wireless communication device and a second wireless communication device over a first wireless communication network, an interconnect communication network, and a second wireless communication network, the method comprising:

a first soft-switch in the first wireless communication network receiving a first message transferred by the first wireless communication device wherein the first message indicates a first telephone number of the first wireless communication device and a second telephone number of the second wireless communication device;

the first soft-switch in the first wireless communication network identifying the interconnect communication network based on the first telephone number and the second telephone number and identifying a first gateway network address for a first media gateway in the interconnect communication network;

after identifying the first gateway network address, the first soft-switch in the first wireless communication network binding the first wireless communication device to the first wireless communication network and binding the first wireless communication network to the first media gateway;

the first soft-switch in the first wireless communication network transferring a second message to a second soft-switch in the second wireless communication network wherein the second message indicates the first telephone number, the second telephone number, and the first gateway network address;

the second soft-switch in the second wireless communication network identifying the interconnect communication network based on the first telephone number and the second telephone number and identifying a second gateway network address for a second media gateway in the interconnect communication network;

after identifying the second gateway network address, the second soft-switch in the second wireless communication network binding the second media gateway to the second wireless communication network and binding the second wireless communication network to the second wireless communication device;

the second soft-switch in the second wireless communication network transferring a third message to the first soft-switch in the first wireless communication network, wherein the third message indicates the second gateway network address; and the first soft-switch in the first wireless communication network receiving the third message that indicates the second gateway network address and in response, transferring a setup completion message to the first wireless communication device, wherein the user data is exchanged between the first wireless communication device and the second wireless communication device over the first wireless communication network, the first media gateway, the second media gateway, and the second wireless communication network.

2. The method of claim 1 wherein the first wireless communication network comprises a first Radio Access Network (RAN) and the second wireless communication network comprises a second RAN.

3. The method of claim 1 wherein the first wireless communication network comprises a first internet protocol (IP)

communication network and the second wireless communication network comprises a second IP communication network.

4. A data communication system configured to exchange user data between a first wireless communication device and a second wireless communication device over a first wireless communication network, an interconnect communication network, and a second wireless communication network, comprising:
- a first soft-switch in the first wireless communication network configured to receive a first message transferred by the first wireless communication device wherein the first message indicates a first telephone number of the first wireless communication device and a second telephone number of the second wireless communication device;
- the first soft-switch in the first wireless communication network configured to identify the interconnect communication network based on the first telephone number and the second telephone number and identify a first gateway network address for a first media gateway in the interconnect communication network;
- the first soft-switch in the first wireless communication network configured to, after identifying the first gateway network address, bind the first wireless communication device to the first wireless communication network and bind the first wireless communication network to the first media gateway;
- the first soft-switch in the first wireless communication network configured to transfer a second message to a second soft-switch in the second wireless communication network wherein the second message indicates the first telephone number, the second telephone number, and the first gateway network address;
- the second soft-switch in the second wireless communication network configured to identify the interconnect communication network based on the first telephone number and the second telephone number and identify a second gateway network address for a second media gateway in the interconnect communication network;
- the second soft-switch in the second wireless communication network configured to, after identifying the second gateway network address, bind the second media gateway to the second wireless communication network and bind the second wireless communication network to the second wireless communication device;
- the second soft-switch in the second wireless communication network configured to transfer a third message to the first soft-switch in the first wireless communication network, wherein the third message indicates the second gateway network address; and
- the first soft-switch in the first wireless communication network configured to receive the third message that indicates the second gateway network address and in response, transfer a setup completion message to the first wireless communication device, wherein the user data is exchanged between the first wireless communication device and the second wireless communication device over the first wireless communication network, the first media gateway, the second media gateway, and the second wireless communication network.

5. The data communication system of claim 4 wherein the first wireless communication network comprises a first Radio Access Network (RAN) and the second wireless communication network comprises a second RAN.

6. The data communication system of claim 4 wherein the first wireless communication network comprises a first internet protocol (IP) communication network and the second wireless communication network comprises a second IP communication network.

* * * * *